(12) United States Patent
Martin et al.

(10) Patent No.: US 12,150,093 B2
(45) Date of Patent: *Nov. 19, 2024

(54) TELECOMMUNICATIONS APPARATUS AND METHODS FOR PAGING OF A MOBILE DEVICE

(71) Applicants: Sony Group Corporation, Tokyo (JP); Sony Mobile Communications Inc., Tokyo (JP)

(72) Inventors: Brian Alexander Martin, Basingstoke (GB); Shin Horng Wong, Basingstoke (GB); Martin Warwick Beale, Basingstoke (GB); Yuxin Wei, Basingstoke (GB); Vivek Sharma, Basingstoke (GB); Shinichiro Tsuda, Basingstoke (GB); Hideji Wakabayashi, Basingstoke (GB); Anders Berggren, Lund (SE)

(73) Assignees: SONY GROUP CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,744

(22) Filed: Aug. 8, 2023

(65) Prior Publication Data
US 2023/0379884 A1    Nov. 23, 2023

Related U.S. Application Data

(63) Continuation of application No. 17/694,055, filed on Mar. 14, 2022, now Pat. No. 11,765,687, which is a
(Continued)

(30) Foreign Application Priority Data

Dec. 23, 2016   (EP) .................................... 16206769

(51) Int. Cl.
*H04W 68/02*   (2009.01)
*H04W 68/00*   (2009.01)
(Continued)

(52) U.S. Cl.
CPC .......... *H04W 68/02* (2013.01); *H04W 68/005* (2013.01); *H04W 76/11* (2018.02); *H04W 76/27* (2018.02)

(58) Field of Classification Search
CPC ..... H04W 68/02; H04W 76/11; H04W 76/27; H04W 68/005
See application file for complete search history.

(56) References Cited

U.S. PATENT DOCUMENTS

| 11,277,816 B2 * | 3/2022 | Martin | ................. | H04W 76/27 |
| 11,765,687 B2 * | 9/2023 | Martin | ................. | H04W 76/27 370/329 |

(Continued)

FOREIGN PATENT DOCUMENTS

WO   2018/029001 A1   2/2018

OTHER PUBLICATIONS

International Search Report and Written Opinion mailed on Feb. 12, 2018 for PCT/EP2017/080828 filed on Nov. 29, 2017, 12 pages.
(Continued)

*Primary Examiner* — Jael M Ulysse
(74) *Attorney, Agent, or Firm* — XSENSUS LLP

(57) ABSTRACT

A method of communicating data between a radio network infrastructure and a terminal device in a wireless telecommunications network. The method comprises establishing at a radio network infrastructure element there is data available for communication between the radio network infrastructure and the terminal device and transmitting a paging message for the terminal device from the radio network infrastructure element. The paging message comprises an indication of an
(Continued)

identifier for the terminal device and an indication of a network allocated resource for use in subsequently communicating the data between the radio network infrastructure element and the terminal device. In response to receiving the paging message the terminal device transmits to the radio network infrastructure element a paging response indicating the terminal device received the paging message, after which the data is communicated between the radio network infrastructure element and the terminal device using the network allocated resource.

20 Claims, 5 Drawing Sheets

Related U.S. Application Data continuation of application No. 16/471,575, filed as application No. PCT/EP2017/080828 on Nov. 29, 2017, now Pat. No. 11,277,816.

(51) Int. Cl.
*H04W 76/11* (2018.01)
*H04W 76/27* (2018.01)

(56) References Cited

U.S. PATENT DOCUMENTS

| | | | |
|---|---|---|---|
| 2006/0014550 A1* | 1/2006 | Ryu | H04W 52/0216 455/574 |
| 2008/0218209 A1* | 9/2008 | Lee | H04W 76/27 326/56 |
| 2010/0240400 A1* | 9/2010 | Choi | H04W 68/02 455/458 |
| 2011/0105155 A1* | 5/2011 | Bienas | H04W 68/02 455/458 |
| 2012/0044910 A1* | 2/2012 | Maeda | H04L 5/001 370/332 |
| 2012/0300655 A1* | 11/2012 | Lee | H04W 24/00 370/252 |
| 2014/0004850 A1* | 1/2014 | Kwon | H04W 68/02 455/458 |
| 2015/0215894 A1* | 7/2015 | Hayashi | H04W 68/005 455/458 |
| 2015/0223196 A1* | 8/2015 | Kim | H04W 68/02 455/458 |
| 2015/0237592 A1* | 8/2015 | Kim | H04W 68/02 455/435.1 |
| 2016/0007316 A1* | 1/2016 | Vaidya | H04W 64/003 370/312 |
| 2016/0135141 A1* | 5/2016 | Burbidge | H04W 68/02 455/458 |
| 2016/0135247 A1* | 5/2016 | Ozturk | H04W 36/0094 455/436 |
| 2016/0205659 A1* | 7/2016 | Bergman | H04W 72/51 370/252 |
| 2016/0205660 A1* | 7/2016 | Ryu | H04W 72/23 455/458 |
| 2016/0205661 A1* | 7/2016 | Ryu | H04W 68/02 455/458 |
| 2016/0374048 A1* | 12/2016 | Griot | H04W 4/70 |
| 2017/0034853 A1* | 2/2017 | Rune | H04W 52/0216 |
| 2017/0367044 A1* | 12/2017 | Fujishiro | H04W 68/02 |
| 2019/0215799 A1* | 7/2019 | Talebi Fard | H04W 68/02 |

OTHER PUBLICATIONS

CATT, "DL small data transmission in inactive state", 3GPP TSG-RAN WG2 Meeting No. 96, R2-167955, Reno USA, Nov. 14-18, 2016, pp. 1-3.

ASUSTeK, "Downlink data transmission and reception in NR new state", 3GPP TSG-RAN WG2 Meeting No. 96, R2-168090, Reno Nevada USA, Nov. 14-18, 2016, 5 pages.

Sony, "Downlink data transmission in RRC_INACTIVE", 3GPP TSG RAN WG2 Meeting No. 96, R2-168551, Reno USA, Nov. 14-18, 2016, 3 pages.

Ericsson, "Signalling flows for paging and resume for inactive state", 3GPP TSG-RAN WG2 Meeting No. 96, Tdoc R2-168712, Reno USA, Nov. 14-18, 2016, pp. 1-7.

Huawei et al., "DL data transmission in RRC_INACTIVE", 3GPP TSG-RAN, WG2 Meeting No. 96, R2-168860 (Clean version identical to R2-168546), Reno Nevada USA, Nov. 14-18, 2016, pp. 1-3.

ETSI MCC, "Draft report of 3GPP TSG RAN WG2 Meeting No. 96 Reno, Nevada, USA, Nov. 14-18, 2016", 3GPP TSG-RAN Working Group 2 Meeting No. 97, Athens Greece Feb. 13-17, 2017, R2-17XXXX, pp. 1-231.

3GPP, "Technical Specification Group Radio Access Network; Study on New Radio Access Technology; Radio Interface Protocol Aspects", Release 14, 3GPP TR 38.804 V0.4.0, Nov. 2016, pp. 1-30.

NTT DOCOMO, "New SID Proposal: Study on New Radio Access Technology", 3GPP TSG RAN Meeting No. 71 RP-160671, Göteborg, Sweden, Mar. 7-10, 2016, 8 pages.

LTE, "Evolved Universal Terrestrial Radio Access (E-UTRA)", Medium Access Control (MAC) protocol specification, ETSI TS 136 321 V13.0.0. Feb. 2016, Release 13, pp. 1-83.

Holma et al., "LTE for UMTS OFDMA and SC-FDMA Based Radio Access", Wiley 2009, System Architecture Based on 3GPP SAE, 11 pages.

Huawei et al., "Evaluation on RAN initialed paging and MME initialed paging", 3GPP TSG-RAN WG2 Meeting No. 94 R2-163930, Nanjing, China, May 23-27, 2016, 12 pages.

NTT DOCOMO, "Revision of SI: Study on New Radio Access Technology", 3GPP TSG RAN Meeting No. 73 RP-161596 revision of RP-161214, New Orleans, Sep. 19-22, 2016, 7 pages.

Intel Corporation, "Discussion on RAN notification area for the new RRC state", 3GPP TSG RAN WG2 Meeting No. 96 R2-168524, Reno, USA, Nov. 14-18, 2016, 3 pages.

Intel Corporation, "RAN based Update mechanism for new RAN state", 3GPP TSG RAN WG2 Meeting No. 96 R2-168525, Reno, USA, Nov. 14-18, 2016, 2 pages.

Qualcomm Incorporated, "NR RRC Inactive State principles—RAN based notification area", 3GPP TSG-RAN WG2 Meeting No. 96 R2-168602, Reno, US, Nov. 14-18, 2016, 2 pages.

NIT DOCOMO Inc., "Text Proposal to TR 38.804 on UE states and state transitions for NR", 3GPP TSG-RAN WG2 #96 R2-168856 Revision of R2-168089, Nov. 14-18, 2016, Reno, USA, pp. 1-4.

Huawei et al., "New WI proposal: Signalling reduction to enable light connection for LTE", 3GPP TSG RAN Meeting No. 71 RP-160540, Gothenburg, Sweden, Mar. 7-10, 2016, 7 pages.

* cited by examiner

TELECOMMUNICATIONS APPARATUS AND METHODS FOR PAGING OF A MOBILE DEVICE

CROSS-REFERENCE TO RELATED APPLICATIONS

The present application is a continuation of U.S. application Ser. No. 17/694,055, filed Mar. 14, 2022, which is a continuation of U.S. application Ser. No. 16/471,575, filed Jun. 20, 2019 (now U.S. Pat. No. 11,277,816), which is based on PCT filing PCT/EP2017/080828, filed Nov. 29, 2017, which claims priority to EP 16206769.8, filed Dec. 23, 2016, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

There is expected to be an increasing need for future wireless communications networks to efficiently support communications with a wider range of devices associated with a wider range of data traffic profiles and types than current systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

Example use cases currently considered to be of interest for next generation wireless communication systems include so-called Enhanced Mobile Broadband (eMBB) and Ultra Reliable and Low Latency Communications (URLLC). See, for example, the 3GPP document RP-160671, "New SID Proposal: Study on New Radio Access Technology," NTT DOCOMO, RAN #71 [1].

The desire to efficiently support transmissions for different services with different characteristics in a wireless telecommunications system gives rise to new challenges to be addressed to help optimise the operation of wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
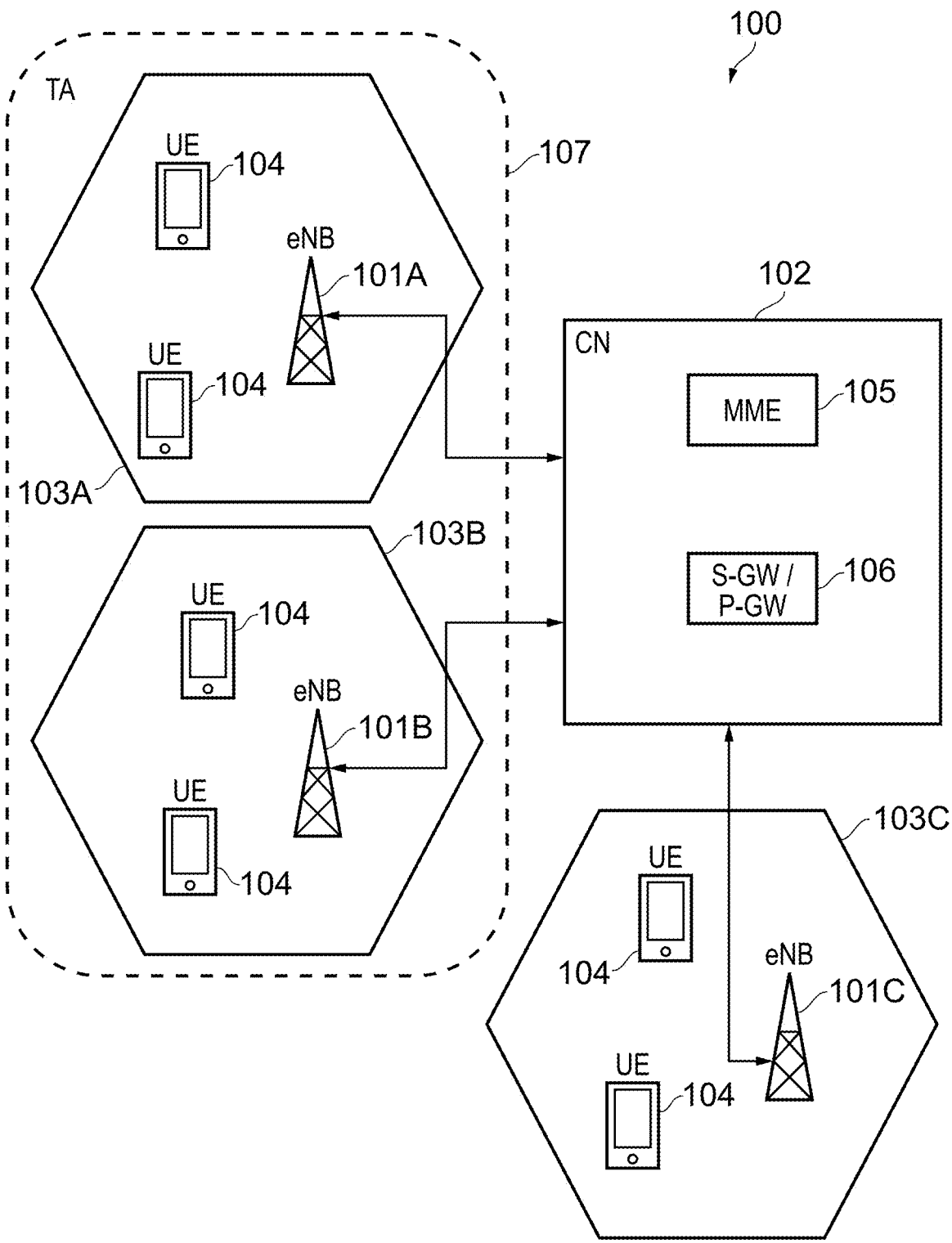
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network includes a plurality of base stations 101A, B, C connected to a core network 102. Each base station provides a coverage area 103A, B, C (i.e. a communication cell) within which data can be communicated to and from various terminal devices 104. In accordance with conventional terminology, a terminal device may also be referred to as a mobile station, user equipment (UE), user terminal, mobile radio, and so forth. Similarly, a base stations may also be referred to as a transceiver station/nodeB/e-NodeB, eNB, gNB, and so forth. Furthermore, it will be appreciated the terms base station and cell may also sometimes be used interchangeably, for example, the process of a terminal device connecting to the radio access part of a wireless telecommunications system might be referred to as accessing a cell or accessing a base station. Nonetheless, it will be appreciated in some cases the physical apparatus comprising a base station may comprise equipment for supporting more than one communication cell and in such cases it can still be appropriate to draw a distinction between base stations and cells.

In terms of basic operation, data are transmitted between base stations 101A, B, C and terminal devices 104 using various radio downlink and uplink channels. The core network 102 routes data to and from terminal devices 104 via respective base stations 101A, B, C and provides functions such as authentication, mobility management, charging and so on. To this end, the core network (CN) 102 comprises a mobility management entity (MME) 105 and a serving gateway (S-GW) entity and a packet data network gateway (P-GW) entity. For simplicity the serving gateway entity and packet data network gateway are schematically represented in FIG. 1 as a single combined (S-GW/P-GW) gateway entity 106.

It is known for a group of base stations (with associated cells) to be logically grouped together into a so-called tracking area (TA). In FIG. 1 the communication cells 103A and 103B associated with base stations 101A and 101B are schematically represented as belonging to a tracking area 107. For this particular example it is assumed the communication cell 103C associated with base station 101C belongs to a different tracking area, although this other tracking area is not represented in the figure. The sizes of tracking areas are typically not specified in wireless telecommunications system specifications. However, a typical tracking area in an LTE-based network might be expected to include perhaps twenty base stations/cells, but could be more/fewer according to the implementation at hand. Tracking areas play a role in paging.

As is well understood, various wireless telecommunications networks, such as the LTE-based network represented in FIG. 1, support different Radio Resource Control (RRC) modes for terminal devices, typically including: (i) RRC idle mode (RRC_IDLE); and (ii) RRC connected mode (RRC-_CONNECTED). When a terminal device transmits data, RRC connected mode is generally used. The RRC idle mode, on the other hand, is for terminal devices which are registered to the network (EMM-REGISTERED), but not currently in active communication (ECM-IDLE).

For a terminal device in RRC idle mode the core network (CN) 102 is aware that the terminal device is present within the network, but the radio access network (RAN) part (comprising the base stations 101A, B, C) is not. More specifically, for a terminal device in RRC idle mode, core network nodes such as the MME 105 of FIG. 1 recognize the idle mode terminal device at a tracking area level. That is to say, the core network 102 does not attempt to keep track of terminal device locations at the level of individual communication cells/base stations, but seeks only to keep track of which tracking area the terminal device is currently located within. The core network will generally assume a terminal device is located within the tracking area(s) associated with the base station most recently accessed by the terminal device, unless the terminal device has since provided a specific tracking area update (TAU) to the network. (As is conventional, idle mode terminal devices are typically required to send a TAU when they detect they have entered a different tracking area to allow the core network to keep track of their location.)

Because the core network tracks terminal devices at a tracking area level, it is generally not possible for the network infrastructure to know which specific base station to use when seeking to initiate contact with a terminal device in idle mode, and this has consequences for how paging procedures in wireless telecommunication systems are performed.

Figure 2:
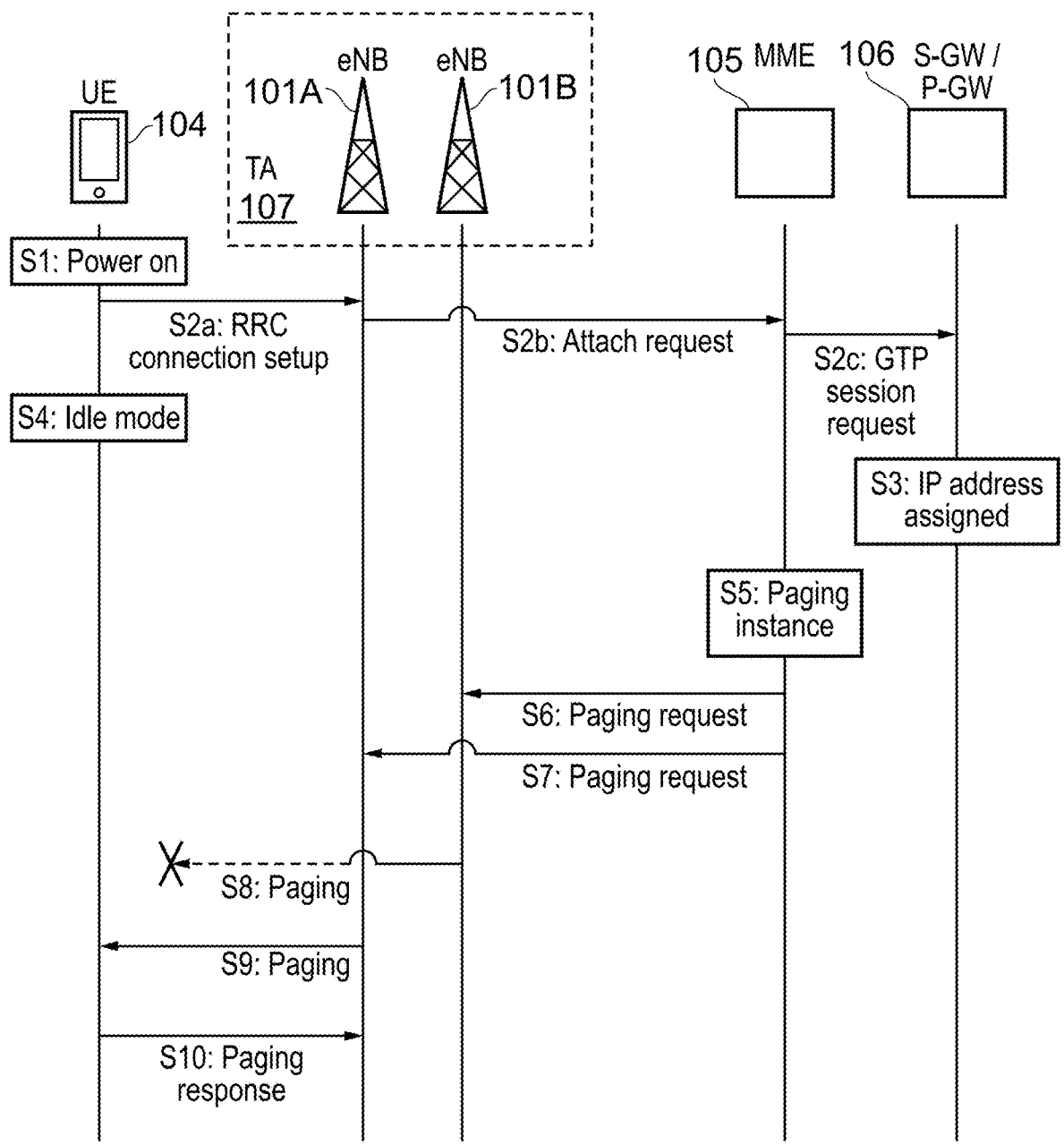
FIG. 2 schematically represents some aspects of a paging procedure in a wireless telecommunications network.

FIG. 2 is a signalling ladder diagram representing some principles of a conventional core-network level paging procedure for a terminal device 104 in an RRC Idle mode in the LTE-type network schematically represented in FIG. 1. FIG. 2 schematically represents signalling and operating functions associated with the terminal device 104, the base stations 101A, 101B comprising the tracking area 107, and the MME 105 and gateway 106 of the core network 102.

For the sake of this example it is assumed the terminal device 104 initially attaches to the network through base station 101A within the tracking area 107 before entering an idle mode. Furthermore, it is assumed the terminal device 104 has not moved to a different tracking area and so has not provided any tracking area update. Thus, the core network 102 will assume the terminal device is located somewhere within tracking area 107 (i.e. somewhere within the coverage areas of communication cells 103A and 103B which comprise the tracking area 107).

Thus, referring to FIG. 2, in step S1 the terminal device 104 is powered on.

In step S2 (comprising sub-steps S2a, S2b and S2c), and in accordance with conventional techniques, an RRC connection procedure (in this example an initial attach procedure) is initiated by the terminal device with signalling exchanged between the terminal device 104, the base station 101A, the MME 105, and gateway 106 as schematically represented in the figure. For LTE this signalling comprises RRC connection setup signalling from the terminal device 104 to the base station 101A (step S2a), attach request signalling from the base station 101A to the MME 105 (step S2b), and GPRS tunnel protocol session request signalling (step S2c).

As is well known, the specific base station through which the terminal device initially attaches may be determined from reference signal measurements, and so forth, whereby the terminal device determines which base station is most appropriate (cell selection).

In step S3 the core network assigns an IP address for the terminal device. From this point the core network recognises the existence of the terminal device and keeps track of its location at a tracking area level as discussed above. Thus, in this particular example, the core network identifies the terminal device as being within tracking area 107 (because the terminal device has accessed the network through base station 101A, which is within tracking area 107).

Although not shown in FIG. 2 in the interests of simplicity, the base station 101A to which the terminal device 104 sends RRC connection setup signalling in step S2 and the terminal device 104 will exchange further signalling to allow the base station 101A to establish capability information for the terminal device 104. For example, the base station 101A will transmit a UE capability enquiry and the terminal device will respond with a UE capability information message.

As schematically represented in step S4, the terminal device having attached to the network and exchanged capability information with the base station, enters RRC idle mode. As is conventional, the base station 101A will discard the UE capability information and other context information associated with the terminal device at this stage.

In step S5 the MME 105 recognises that a paging instance has arisen for the terminal device 104. The specific reason for the paging requirement is not significant, and may, for example be because a third party is seeking to place a telephone call to the terminal device 104.

As has been discussed above, the MME 105 in the core network 102 can recognise the terminal device is located in one of the communication cells 103A and 103B which comprise tracking area 107, but the MME 105 does not know which one. Accordingly, the MME 105 sends a paging request message over the S1-AP interface to each of the base stations associated with the tracking area 107. Thus, in this example the MME 105 sends paging request messages to both base stations 101A and 101B, as schematically represented in steps S6 and S7. The MME 105 does not send a paging request message to the base station 101C serving communication cell 103C because communication cell 103C is not within tracking area 107 in which the terminal device is taken as being located.

The base stations receiving a paging request message from the MME 105, in this case base stations 101A and 101B, are configured to transmit paging signalling to seek to establish contact with the terminal device 104. This is schematically represented in FIG. 2 in steps S8 and S9.

It is assumed for this example the terminal device has remained within the coverage area 103A of base station 101A and so receives the paging signalling transmitted in step S9 by base station 101A, and responds accordingly, as schematically indicated in step S10, for example by initiating a random access procedure to establish an RRC connection to the network. The paging signalling sent in step S8 by base station 101B is not received by the terminal device 104 and so is in effect wasted signalling.

Following step S10, the various elements represented in FIG. 2 may continue to exchange signalling in accordance with conventional techniques, for example depending on why the paging instance arose in step S5.

Thus, FIG. 2 schematically represents a conventional manner for paging terminal devices in RRC idle mode in a wireless telecommunications system in what might be referred to as core network level paging.

Idle mode terminal devices are conventionally configured to seek paging messages periodically. For terminal devices operating in a discontinuous reception (DRX) mode this occurs each time they wake up for their DRX active time. Paging signals for a specific terminal device are transmitted in defined frames (Paging Frames)/sub-frames (Paging Occasions) which are derived from the International Mobile Subscriber Identifier (IMSI) of the terminal device, as well as paging related DRX parameters established in system information transmitted within the network.

In a conventional LTE-based system, a terminal device thus receives and checks the contents of specific sub-frames (paging occasions) in specific frames (paging frames) to look for paging signalling. For example, in accordance with the standards set out in ETSI TS 136 321 V13.0.0 (2016 February)/3GPP TS 36.321 version 13.0.0 Release 13 [3], a Paging Frame (PF) is a downlink radio frame which may contain one or more Paging Occasion(s) (PO), where a Paging Occasion is a sub-frame in which there may be paging signalling. Paging signalling is conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all terminal devices (e.g. set at FFFE in hexa-decimal for the standard defined by ETSI TS 136 321 V13.0.0 (2016 February)/3GPP TS 36.321 version 13.0.0 Release 13 [3]). All terminal devices check whether PDCCH at the specific PF/PO includes P-RNTI or not. If there is a PDSCH allocation addressed to P-RNTI in the relevant subframe, the terminal device proceeds to seek to receive and decode the paging messages transmitted on the allocated resources on PDSCH. The UE then checks the list of IDs contained in the paging record list in the received paging message, to determine whether the list contains an ID corresponding to itself (for example P-TMSI or IMSI), and if so initiates a paging response.

Although the above description has summarised existing LTE paging procedures, it is expected that some broadly similar principles may be adopted for future wireless telecommunications networks, and the inventors have recognised there are ways in which these procedures may be modified to provide enhanced functionality, both for existing wireless telecommunication network architectures and wireless telecommunications network architectures based on newer radio access technologies (RATs), such as 5G networks.

Figure 3:
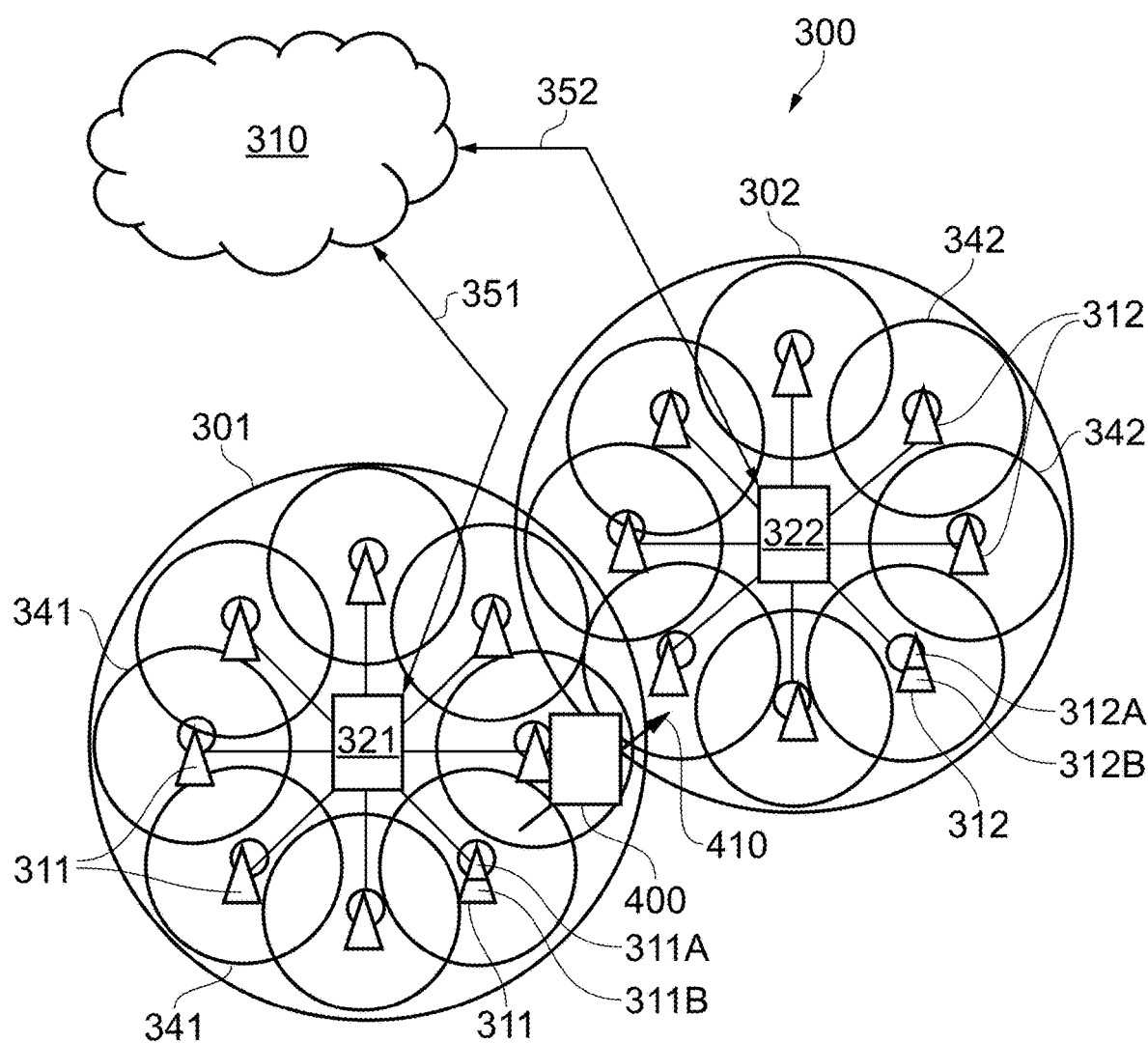
FIG. 3 schematically represents some aspects of a new radio access technology (RAT) wireless telecommunications network which may be configured to operate in accordance with certain embodiments of the present disclosure.

FIG. 3 is a schematic diagram illustrating an example network architecture for a new RAT wireless mobile telecommunications network/system 300 based on previously proposed approaches which may also be adapted to provide functionality in accordance with embodiments of the disclosure described herein. The new RAT network 300 represented in FIG. 3 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT telecommunications system represented in FIG. 3 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/element may be used to encompass these elements and more conventional base station type elements of wireless telecommunications systems. Depending on the application at hand the responsibility for scheduling transmissions on the radio interface between the respective distributed units and the terminal devices may lie with the controlling node/centralised unit and/or the distributed units/TRPs.

A terminal device 400 is represented in FIG. 3 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. The active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 3, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 3 represents merely one example of a proposed architecture for a new RAT telecommunications system in which approaches in accordance with the principles described herein may be adopted, and the functionality disclosed herein may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

Certain embodiments of the invention as discussed herein may be implemented in wireless telecommunication systems/networks according to various different architectures, such as the example architectures shown in FIGS. 1 and 3 or in other architectures that may be adopted. It will thus be appreciated the specific wireless telecommunications architecture in any given implementation is not of primary significance to the principles described herein. In this regard, certain embodiments of the disclosure may be described generally in the context of a radio network infrastructure element communicating with a terminal device, wherein the specific nature of the radio network infrastructure element and the terminal device will depend on the network infrastructure architecture for the implementation at hand. For example, in some scenarios the radio network infrastructure element may comprise a base station, such as an LTE-type base station 101 as shown in FIG. 1 which is adapted to provide functionality in accordance with the principles described herein, and in other examples the network infrastructure equipment may comprise a controlling node 321, 322 and/or a TRP 311, 312 of the kind shown in FIG. 3 which is adapted to provide functionality in accordance with the principles described herein. For the sake of simplicity the term base station may be used herein to refer to any form of radio network infrastructure element configured to provide functionality in accordance with the principles described herein.

As already noted above, it is well understood that in wireless telecommunications networks, such as an LTE type network, there are different Radio Resource Control (RRC) modes for terminal devices. For example, it is common to support an RRC idle mode (RRC_IDLE); and an RRC connected mode (RRC_CONNECTED).

Generally speaking, in RRC connected mode a terminal device is connected to a base station in the sense of being able to receive user plane data from the base station and in RRC idle mode the terminal device is not connected to a base station in the sense of not being able to receive user plane data from the base station. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station.

One characteristic of the RRC connected mode is the allocation of a cell-specific radio network temporary identifier (C-RNTI) to the terminal device to allow the base station to which the terminal device is connected to address communications to the terminal device. A terminal device in a conventional RRC idle mode will not be associated with this kind of RNTI.

Another characteristic of the RRC connected mode is the association of one or more dedicated logical channels with the terminal device to allow the terminal device to exchange data with the base station to which it is connected. A terminal device in a conventional RRC idle mode will not be associated with this kind of dedicated logical communication channel.

Another characteristic of the RRC connected mode is that a terminal device in RRC connected mode will have established a security context by exchanging security settings with the base station to which it is attached as part of its RRC connection procedure. A terminal device in a conventional RRC idle mode will not, however, have this kind of established security context.

More generally, a base station to which a terminal device is connected in RRC connected mode will retain information relating to the terminal device, for example its allocated C-RNTI, logical channel configuration settings, security settings, and so on, to allow the base station to communicate with the terminal device. This information may generally be referred to as a terminal device context in/at the base station (or other network infrastructure equipment/node according to the specific network architecture at hand).

In accordance with conventional approaches, when a terminal device releases its RRC connection with respect to a particular base station and transitions to conventional RRC idle mode, the base station releases the terminal device context.

Whilst in RRC idle mode a terminal device will receive signalling from base stations covering its location (i.e. base stations within radio signalling range of its location), for example reference signalling and other broadcast signalling. Based on this signalling the terminal device is able to determine what is currently the most appropriate base station to connect to were the terminal device required to establish a connection to the network, for example to transmit uplink data or in response to a paging request. This ongoing procedure/process for determining the most appropriate base station to connect to is known as cell selection/reselection. The terminal device will synchronise to a selected base station and decode relevant broadcast information, for example information transmitted in master information block (MIB) and system information block (SIB) transmissions, from the selected base station so the terminal device is able to initiate a radio resource connection with the selected base station as and when appropriate. A terminal device will also monitor a paging channel associated with the base station to which it is synchronised in idle mode to identify if any paging requests are addressed to the terminal device. When a terminal device operating in an RRC idle mode wishes to transition to an RRC connected mode to exchange data with the network, it transmits an RRC connection request message to the currently selected base station to initiate an RRC connection procedure in accordance with well-established techniques.

In association with the RRC connection procedure, signalling is exchanged between the terminal device and the base station to allow the base station to establish a context for the terminal device to support subsequent communications in the RRC connected mode, for example to exchange information relating to a C-RNTI for the terminal device, dedicated logical channel configuration settings, and security settings.

Thus to summarise some aspects of RRC idle and connected modes/states, In RRC Connected State, the network is aware of the UE's location at the cell level and has the UE context thereby allowing scheduling of physical resources for user data transmissions because the UE (terminal device) has been assigned a temporary ID (C-RNTI) which is unique to that UE within the cell and hence the UE can be directly addressed by the network. In the Idle Mode, the network is aware of the UE's location within a Tracking Area and does not have the UE context and cannot schedule physical resources for user data transmission because the UE does not have a unique identifier within a cell (C-RNTI). The UE moves from an Idle Mode to an RRC Connected State by establishing an RRC Connection which assigns a C-RNTI using a random access (RACH) procedure. The UE moves from RRC Connected State to Idle Mode by releasing its RRC Connection (and hence releasing C-RNTI). In idle mode, a UE is addressed by first paging the cells within the tracking area. The UE monitors for P-RNTI (paging identifier) on PDCCH rather than C-RNTI as it does in RRC connected state. The paging message which is received following P-RNTI detection contains the UE identity, and if the UE receives this it will then respond by establishing an RRC connection and having a C-RNTI assigned.

The use of RRC idle mode can be beneficial for a terminal device, for example in terms of power saving. However, a drawback of switching to RRC idle is the signalling overhead associated with establishing a new RRC connection when the terminal device is required to reconnect to a base station and exchange data with the base station to allow the base station to establish a context for the terminal device. This signalling overhead has an impact for the terminal device in terms of using power and also for the wireless telecommunications network as a whole in terms of taking up radio resources that might otherwise be used for other communications. Consequently, there is typically a compromise to be made between entering RRC idle mode frequently (to preserve terminal device power) and remaining in RRC connected mode for longer periods (to reduce re-connection signalling overhead).

This means that while RRC idle and RRC connected states can help efficiently support communications in scenarios involving the transmission of relatively large amounts of data, it has been recognised that these states may be less efficient in supporting communications in scenarios in which relatively small amounts of data are transmitted, potentially relatively frequently, for example in accordance with some of the new types of traffic profiles that may be expected to become more prevalent in new telecommunication systems.

With this in mind it has been proposed for Release 14 of the 3GPP standard to consider using a modified approach for RRC modes/states to support certain communications. See, for example, the 3GPP document "New WI proposal: Signalling reduction to enable light connection for LTE", 3GPP TSG RAN Meeting #71, RP-160540, Gothenburg, Sweden, 7-10 Mar. 2016 [4].

One proposal is to define a new/modified RRC mode in which the a UE is not in an active RRC connected mode with the radio access network (RAN), but is considered to be RRC Connected from a CN (core network) point of view, so that data can be sent without CN-level paging, but with paging performed instead at the RAN level, to cause/trigger the UE to resume RRC connection (enter an RRC connected mode). This modified RRC state may be referred to as an "RRC connected inactive" state and may have characteristics as discussed in the 3GPP document "Text Proposal to TR 38.804 on UE states and state transitions for NR", 3GPP TSG-RAN WG2 #96, R2-168856, R2-168856, 14-18 Nov. 2016 [5]. This approach has the benefit of being able to allow the UE to enter a more power efficient state, while reducing the signalling between the CN and the RAN. The overall procedure allows RAN to take over responsibility for paging the UE, effectively hiding the RRC state transitions and mobility from the CN, and the CN therefore may directly send data as if the UE was still connected and in the same cell.

Much like conventional paging procedures at the CN level (e.g. as discussed above with reference to FIG. 2), paging procedures at the RAN level may be associated with a RAN notification area corresponding to the CN tracking area concept. That is to say, the base stations (or other TRPs) supporting the RAN in a network may be notionally divided into groups of base stations comprising respective RAN notification areas. A terminal device leaving a RAN paging notification area may be configured to inform/update the network of it changing location in much the same way as a terminal device leaving a conventional tracking area transmits a tracking area update. For ease of explanation it is assumed for the example discussed here that the RAN notification areas correspond with the CN level tracking areas of the network, and in that sense the terminology notification area and tracking area may be used interchangeably. However, it will be appreciated there is no need for the RAN level notification areas/tracking areas to correspond in size and arrangement with the CN level tracking areas, and in fact it may expected in practice that the RAN level notification areas will typically be smaller (i.e. comprise fewer base stations) than the CN level paging areas (i.e. what are referred to as tracking areas in LTE terminology), and further more may be terminal device specific. However, the relative sizes of, and the degree of correspondence between, the RAN level notification areas and the CN level paging areas is not significant to the principles described herein.

Thus, from the RAN point of view, an "anchor" eNB (e.g. the last eNB the UE was connected to) may be defined, which stores the UE context information. When the CN attempts to transmit data to the UE, the RAN then attempts to page the UE on the anchor eNB, and if there is no response, the paging may then be performed on all of the cells in the tracking area/RAN notification area, in order to locate the UE. A summary of this approach may be found in the 3GPP document "Evaluation on RAN initiated paging and MME initiated paging", 3GPP TSG-RAN WG2 Meeting #94, R2-163930, Nanjing, China, 23-27 May 2016 [6]. It will be appreciated there are various aspects of the specific paging procedure that may be adopted, for example in terms of whether the anchor base station should instruct other base stations in the RAN tracking/notification area to attempt to page the terminal device at the same time as the anchor base station pages the terminal device or only after failing to successfully page the terminal device, that will depend on the implementation at hand, and are not significant here.

The overall procedure in the RAN part of the network, from a terminal device's point of view, may be similar to the suspend/resume procedure introduced in Release 13 of the 3GPP standards for "Internet of Things" terminal devices. Thus when a terminal device connection to a base station is released, a "resume ID" is assigned to context information stored in the network for the terminal device, and when the terminal device reconnects using the "resume" procedure, the resume ID is used to locate the stored context information for the terminal device in the network.

Recent discussions within the 3GPP community have further considered issues of notification/tracking in a RRC connected inactive state for 5G new Radio (NR or 5G-RAN), for example as set out in the 3GPP documents "RAN based Update mechanism for new RAN state", 3GPP TSG RAN WG2 Meeting #96, R2-168525, Reno, USA, 14-18 Nov. 2016 [7]; "Discussion on RAN notification area for the new RRC state" 3GPP TSG RAN WG2 Meeting #96, R2-168524, Reno, USA, 14-18 Nov. 2016 [8]; and "Inactive State principles—RAN based notification area", 3GPP TSG RAN WG2 Meeting #96, R2-168602, Reno, USA, 14-18 Nov. 2016 [9]. Based on these discussions various aspects relating to using this type of approach have been discussed, such as:

RAN2 should assume that UEs perform CN level location updates when crossing a TA boundary when in RRC connected inactive mode (in addition to RAN updates based on RAN notification areas).

There will be NG Core/CN Location Area code (similar to Tracking Area code) broadcast in system information of an NR Cell.

RAN based notification area is UE-specific and configurable by the base station via dedicated signalling.

There will be a unique global Cell ID broadcast in system information of NR Cell.

For the RRC connected inactive state there will be a way to configure the UE with a RAN based notification area that is smaller than a TA.

A RAN notification area may cover a single cell or multiple cells.

Certain embodiments of the disclosure are directed towards methods and apparatus for efficiently communicating data, in particular relatively small amounts of downlink data, with terminal devices which are not in an RRC connected mode, for example terminal devices which may be in an RRC idle mode or an RRC connected inactive mode. In accordance with certain examples, this may be achieved by communicating data with terminal devices in association with modified paging procedures as discussed further herein.

Figure 4:
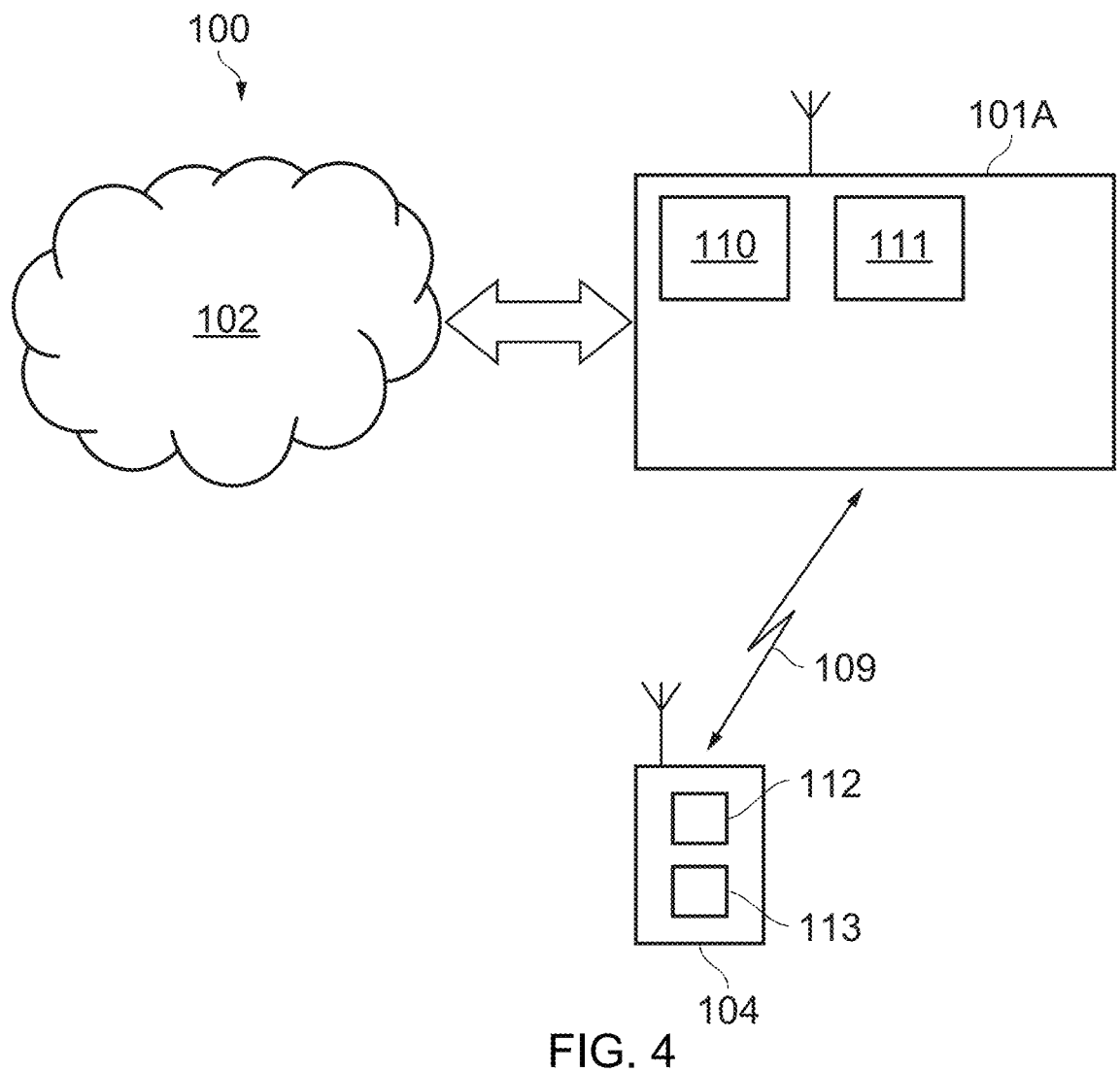
FIG. 4 schematically represents some further aspects of the wireless telecommunication network of FIG. 1.

FIG. 4 schematically shows some further details of the telecommunications system 100 shown in FIG. 1 according to an embodiment of the present disclosure. As already noted, the telecommunications system 100 in this example is based broadly around an LTE-type architecture, but the telecommunications system may also support other radio access technologies, either using the same hardware as represented in FIG. 4 with appropriately configured functionality, or separate hardware configured to operate in association with the hardware represented in FIG. 4. Many aspects of the operation of the telecommunications system/network 100 are known and understood and are not described here in detail in the interest of brevity. Operational aspects of the telecommunications system 100 which are not specifically described herein may be implemented in accordance with any known techniques, for example according to the current LTE-standards and other proposals for operating wireless telecommunications systems.

The telecommunications system 100 comprises a core network part (evolved packet core) 102 coupled to a radio network part. The radio network part comprises a base station (evolved-nodeB) 101A coupled to a terminal device 104. In this example representation in FIG. 4, only one base station 101A and one terminal device 104 are represented. However, it will of course be appreciated that in practice, and as schematically represented in FIG. 1, the radio network part will typically comprise a plurality of base stations serving a larger number of terminal devices across various communication cells. The network may also potentially include transceiver stations supporting radio communications with terminal devices on cells operating in accordance with other radio access technologies, such as UTRAN, GERAN, WLAN or a 5G new RAT. However, only a single base station and terminal device are shown in FIG. 4 in the interests of simplicity.

The terminal device 104 is arranged to communicate data to and from the base station (transceiver station) 101A. The base station is in turn communicatively connected to the serving gateway, S-GW, (not shown in FIG. 4) in the core network part which is arranged to perform routing and management of mobile communications services to the terminal device in the telecommunications system 100 via the base station 101A. In order to maintain mobility management and connectivity, the core network part 102 also includes the mobility management entity, MME, (not shown in FIG. 4) which manages the enhanced packet service, EPS, connections with the terminal device 104 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 102 to an external packet data network, for example the Internet. As noted above, the operation of the various elements of the communications system 100 shown in FIG. 4 may be conventional apart from where modified to provide functionality in accordance with embodiments of the present disclosure as discussed herein. It will be appreciated embodiments of the invention may in general be implemented in wireless communications systems operating in accordance with different radio access technologies, for example, one or more of UTRAN, GERAN, WLAN or a 5G new RAT (NR) networks, and these other radio access technologies will not necessarily incorporate the same network infrastructure components as for an LTE implementation (e.g. there may be no serving gateway in new RAT networks).

The terminal device 104 is adapted to support operations in accordance with embodiments of the present disclosure when communicating with the base station 101A as discussed further herein. The terminal device 104 comprises transceiver circuitry 112 (which may also be referred to as a transceiver/transceiver unit) for transmission and reception of wireless signals and processor circuitry 113 (which may also be referred to as a processor/processor unit) configured to control the terminal device 104. The processor circuitry 113 may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 113 may comprise circuitry which is suitably configured/programmed to provide the desired functionality described herein using conventional programming/configuration techniques for equipment in wireless telecommunications systems. The transceiver circuitry 112 and the processor circuitry 113 are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 104 will in general comprise various other elements associated with its operating functionality, for example a power source, user interface, and so forth, but these are not shown in FIG. 4 in the interests of simplicity.

The base station 101A comprises transceiver circuitry 110 (which may also be referred to as a transceiver/transceiver unit) for transmission and reception of wireless signals and processor circuitry 111 (which may also be referred to as a processor/processor unit) configured to control the base station 101A to operate in accordance with embodiments of the present disclosure as described herein. The processor circuitry 111 may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 111 may comprise circuitry which is suitably configured/programmed to provide the desired functionality described herein using conventional programming/configuration techniques for equipment in wireless telecommunications systems. The transceiver circuitry 110 and the processor circuitry 111 are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 101A will in general comprise various other elements associated with its operating functionality, such as a scheduler. For example, although not shown in FIG. 4 for simplicity, the processor circuitry 111 may comprise scheduling circuitry, that is to say the processor circuitry 111 may be configured/programmed to provide the scheduling function for the base station 101A.

Thus, the base station 101A is configured to communicate data with the terminal device 104 over a radio communication link 109 using the principles described herein.

In broad summary, to help facilitate efficient communication of data in wireless telecommunications networks, certain example approaches in accordance with certain embodiments of the disclosure propose to communicate data between a radio network infrastructure element (i.e. an element of the radio access network infrastructure, such as a base station or other form of TRP depending in the network infrastructure at hand) using a network allocated resource (such as a network allocated identifier or network allocated physical transmission resources), that is allocated to a terminal device in association with a paging message for the terminal device.

Figure 5:
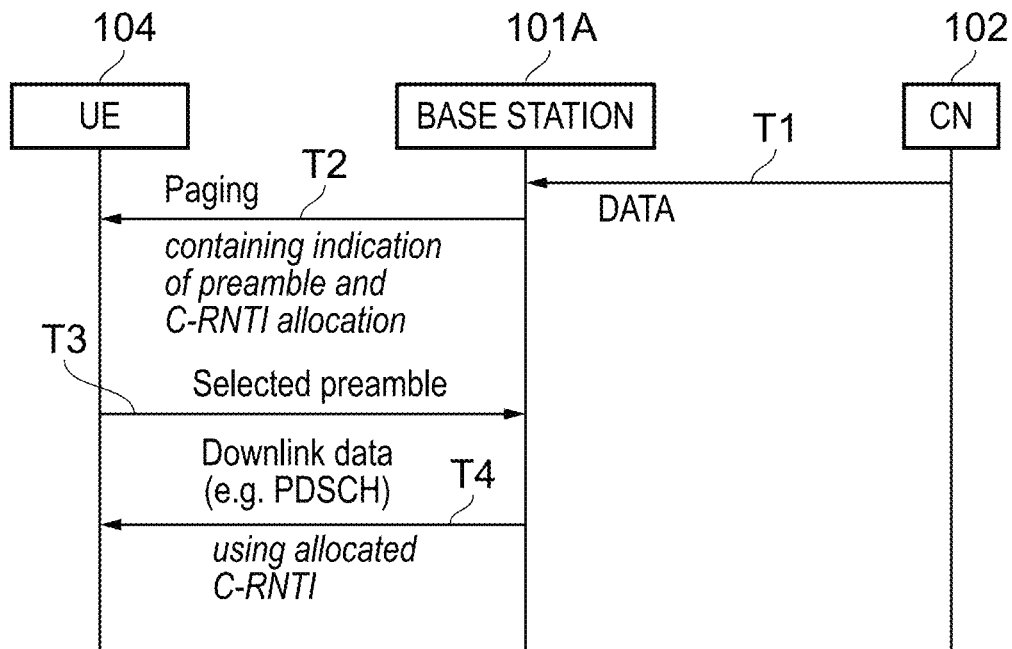
FIGS. 5 and 6 are ladder diagrams schematically representing operating aspects of network infrastructure equipment and a terminal device in accordance with certain embodiments of the disclosure.

FIG. 5 is a ladder diagram schematically representing some aspects of signalling exchange between the terminal device 104, the base station 101A and the core network 102 of FIGS. 1 and 4 in accordance with certain embodiments of the disclosure.

For the sake of providing a specific example, it is assumed here the terminal device 104 is within the communication cell 103A supported by the base station 101A and is not in an active RRC connected mode but is in an RRC connected inactive mode of the kind recently proposed and discussed above. It is further assumed that prior to entering the non-active RRC connected mode, the terminal device was in an active RRC connected mode with respect to the base station 101A, for example, because the terminal device was previously involved in an ongoing data communication session with the base station 101A before entering the RRC connected inactive mode when that data communication session had finished. Furthermore still, it is assumed that at the start of the processing represented in FIG. 5, data for communication between the base station and the terminal device has become available in the network, for example because the core network has received the data from an external source for transmission to the terminal device. The data may be user data (i.e. data associated with a layer higher than the physical layer), but the specific content of the data and the reason why the data has become available is not significant to the principles described herein. It may generally be expected approaches in accordance with the principles described herein may be most applicable for relatively small amounts of data, for example on the order of up to the amount of data that can be communicated in a single subframe, but the approach can in principle be used for communicating any amount of data.

In step T1 of the processing represented in FIG. 5 the core network 102 conveys the data intended to be communicated to the terminal device 104 to the base station 101A along with an indicator of the terminal device for which the data is intended, and this may be done in accordance with conventional techniques. In accordance with the principles discussed above, the transition of the UE 104 to the RRC connected inactive mode prior to the processing represented in FIG. 5 may be transparent to the core network 102. Accordingly, in step T1 the core network simply communicates the data to the base station 101A with which the terminal device 104 was last in active RRC connected mode in the same way as if the terminal device was in fact still in an active RRC connected mode on that base station (which so far as the core network is concerned in this example, it still is). In this regard the base station 101A may be referred to as an anchor base station/anchor eNB for the terminal device. Receiving the data from the core network in step T1 causes the base station to establish there is data available for communication between the base station and the terminal device. It will be appreciated this example in which the base station 101A receives the data for communication to the terminal device from the core network represents only one example implementation scenario. In other implementation scenarios the base station may receive the data for communication to the terminal device from another source, for example from another base station/eNB.

The base station 101A is aware the terminal device 104 is in an RRC connected inactive mode, but in accordance with the proposed operating principles for the RRC connected inactive mode, the base station is not aware of whether the terminal device is still within its communication cell or has moved to another communication cell. As noted above, it is assumed in this example the terminal device has remained within the communication cell of the base station 101A while in the RRC connected inactive mode. Nonetheless, because the base station 101A is not aware of this, it undertakes further communications with other base stations which are not shown in FIG. 5 in the interests of simplicity, but which are discussed further below with reference to FIG. 6.

In step T2, having established there is data available for communication with the terminal device, the base station (radio network infrastructure element) 101A transmits a paging message for the terminal device 104 that includes an identifier for the terminal device that allows the terminal device to determine it is the intended recipient of the paging message. In this regard, the paging message may be transmitted by the base station 101A generally in accordance with established techniques, for example corresponding to step S9 of FIG. 2, but in accordance with certain embodiments of the disclosure, the paging message further conveys additional information to the recipient terminal device. In particular, in addition to containing an indication of an identifier for the terminal device, the paging message further comprises an indication of a network allocated resource that may be used for subsequently communicating the data between the radio network infrastructure element and the terminal device. In the specific example presented in FIG. 5, the network allocated resource comprises a cell-specific radio network temporary identifier, C-RNTI, to which a subsequent allocation of radio resources for conveying the data may be addressed. In this example, the paging message further includes an indication of a preamble to be used by the terminal device in responding to the paging message. In some example embodiments, the paging message may further include timing advance information, resource allocation information, or other information related to the transmission of a response message in the uplink, for example using PUCCH or PUSCH channels in LTE, or equivalent channels in NR.

Thus, the paging message of step T2 may comprise physical transmission resource allocation signalling addressed to a common radio network temporary identifier for paging, P-RNTI, with transmissions on the physical transmission resources indicated by the allocation signalling containing an identifier for the terminal device and an indication of the network-allocated resource, which in this example comprises a C-RNTI allocated to the terminal device. The C-RNTI in this example may be selected by the base station from among the available C-RNTI having regard to the same considerations as when allocating a C-RNTI to a terminal device during a conventional RRC connection procedure, although a significant difference here is that the terminal device is allocated the C-RNTI in the paging message and not as part of an RRC connection procedure.

In step T3, on receiving the paging message and determining the paging message is addressed to it (on the basis of the indication of an identifier for the terminal device included in the paging message), the terminal device transmits a paging response. In a conventional paging procedure, a terminal device will respond to a paging message by initiating a random access procedure to initiate an RRC connection setup procedure. A first step in the random access procedure is the transmission of a random access preamble. In accordance with certain embodiments of the disclosure, in step T3 the terminal device transmits a preamble derived from the indication of the allocated preamble received from the base station in step T2 on a random access channel. The transmission of this preamble corresponds with the paging response, and the terminal device does not proceed to complete an RRC connection set-up procedure. In some alternative embodiments the paging response may be transmitted after performing random access (Msg1) and receiving a random access response (Msg2) including an uplink grant to transmit an RRC message (Msg3).

On receiving the paging response (which may be a preamble or a message or another indication) transmitted by the terminal device in step T3, the base station 101A is able to recognise from the paging response (e.g. based on the preamble used in this example implementation) that the paging response has come from the terminal device to which the paging message was addressed in step T2 (since it was this paging message that indicated the specific preamble to use for the paging response in this example implementation). Accordingly, reception of the relevant preamble is taken by the base station 101A to be an indication that the terminal device 104 received the paging message transmitted in step T2 (i.e. the terminal device is within the coverage cell of the base station 101A).

Thus, on completion of step T3, the base station 101A has determined that the terminal device to which the data received from the core network in step T1 is to be transmitted is within its coverage area, and furthermore the base station 101A has provided the terminal device with an indication of a network allocated resource, in this example a C-RNTI, that the network can now use to communicate data with the terminal device. Significantly, the network allocated resource for supporting subsequent data exchange is provided to the terminal device without the terminal device needing to enter an active RRC connected mode.

In step T4 the base station 101A proceeds to communicate the data received from the core network 102 in step T1 to the terminal device 104. In this example implementation this is done by the base station allocating downlink resources to the terminal device by addressing control signalling on a physical downlink control channel, e.g. PDCCH in LTE terminology, to the C-RNTI allocated to the terminal device in the paging message of step T2 to indicate physical transmission resources on a physical downlink shared channel, e.g. PDSCH in LTE terminology, on which the data is to be transmitted. In this regard, the process of transmitting the data in step T4 may be based on conventional data transmission schemes in wireless telecommunications networks, albeit with the terminal device not being in an active RRC connected state and having received its temporary radio network identifier in association with a paging message received from the base station (i.e. step T2 in FIG. 5) as opposed to during a random access connection procedure.

Whereas FIG. 5 schematically shows the principles underlying an approach in accordance with certain embodiments of the disclosure in which a terminal device has remained within the coverage area/cell of the base station 101A to which it was RRC connected before transitioning to the RRC connected inactive mode, in the general case, a terminal device in RRC connected inactive mode may move to the coverage area associated with another base station due mobility. If the terminal device remains within the same RAN notification area (which in this example if considered for ease of explanation to correspond to (i.e. comprise the same base stations as) the CN level tracking area 107 shown in FIG. 1), it may be expected the terminal device will not notify the network of this mobility. Accordingly, it is possible that when the base station to which the terminal device was last RRC connected receives data from the core network, the terminal device might no longer be within its coverage area, and the base station will not know this. Furthermore, for a terminal device which has transitioned to the proposed RRC connected inactive mode, the core network will not be aware the radio access network is unaware of the location of the terminal device, and so it will not initiate a conventional core network level paging procedure, but will simply forward data to the base station with which the terminal device was last active RRC connected mode (e.g. as in step T1 of FIG. 5). To address this issue, what might be referred to as radio network level paging is adopted as noted above. Put simply, when a base station receives data from the core network for a terminal device that it has previously configured to enter an RRC connected inactive state, in addition to seeking to page the terminal device as discussed above with reference to FIG. 5, the base station also triggers other base stations in the tracking area to seek to page the terminal device in a similar manner. An approach along these lines is schematically shown in the signalling ladder diagram of FIG. 6.

Figure 6:
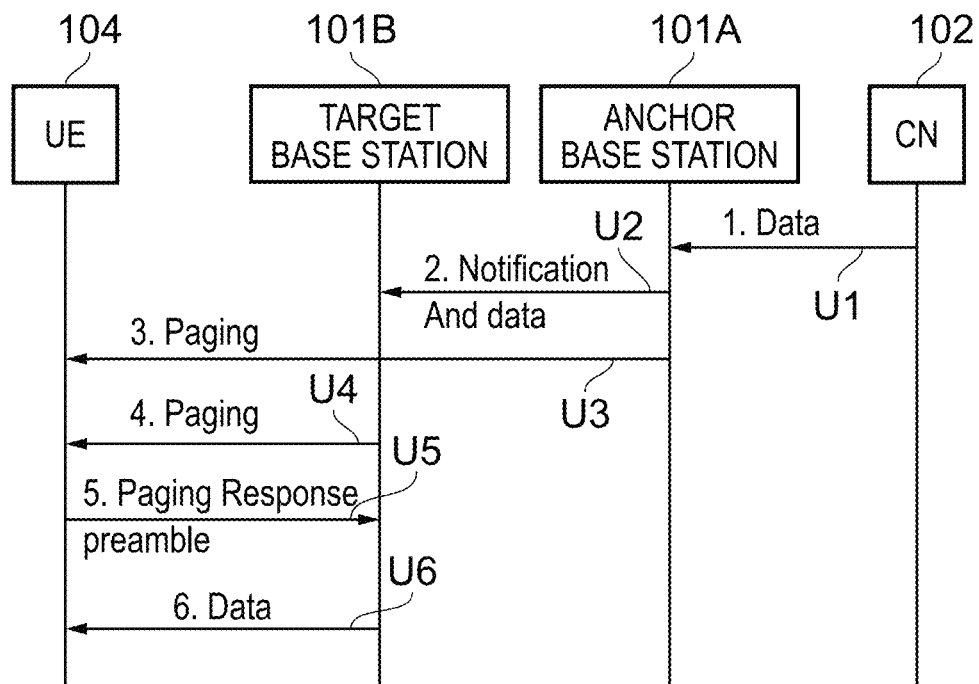

Thus, FIG. 6 is a ladder diagram schematically representing some aspects of signalling exchange between the terminal device 104, the base station 101A, the base station 101B, and the core network 102 of FIG. 1 in accordance with certain embodiments of the disclosure.

For the sake of providing a specific example, it is assumed here the terminal device 104 is located within the communication cell 103B supported by the base station 101B and is in an RRC connected inactive mode of the kind recently proposed and discussed above. It is further assumed that prior to entering the non-active RRC connected mode, the terminal device was in an active RRC connected mode with respect to the base station 101A, for example, because the terminal device was previously located within the communication cell 103A supported by the base station 101A and involved in an ongoing data communication session with the base station 101A before being configured to enter the RRC connected inactive mode by the base station 101A. Thus it is assumed the terminal device 104 has moved from a location within the communication cell 103A supported by the base station 101A to a location within the communication cell 103B supported by the base station 101B while in the RRC connected inactive mode.

By way of terminology, the base station 101A with which the terminal device was last in an active RRC connected state may be referred to as the anchor base station 101A for the terminal device 104, and the base station 101B supporting the communication cell into which the terminal device has moved may be referred to as the target base station 101B, or the currently selected base station 101B (i.e. the base station the terminal device has currently selected according to its cell (re)selection procedures). The communication cells supported by the respective base stations may be similarly referred to as the anchor cell 103A and the target (currently selected) cell 101B.

In this example the anchor base station and the target base station are in the same RAN notification area/tracking area 107, and so the terminal device 104 will not have provided any indication to the network that its mobility has moved it from the anchor cell to the target cell. Rather, the terminal device 104 will simply have reselected a new base station in accordance with conventional cell selection procedures and started monitoring relevant transmissions on that cell, for example the paging channel. Furthermore, and as discussed above, in accordance with proposed approaches for the RRC connected inactive mode, the core network 102 in this example will also be unaware the terminal device 104 is no longer in an active RRC connected state with respect to the anchor base station, and so will assume the terminal device remains within the anchor communication cell 103A. Consequently, when data for the terminal device is received by the core network, it is forwarded to the anchor base station in the normal way, and as discussed above with reference to step T1 in FIG. 5.

Thus, step U1 in FIG. 6 is similar to, and will be understood from, step T1 in FIG. 5, and in step U1 data is received at the anchor base station 101A from the core network 102 (e.g. a 5G/new RAT core network/evolved packet core (EPC)).

Because the anchor base station 101A is aware it has configured the terminal device to RRC connected inactive mode, the anchor base station knows the terminal device may have moved out of its coverage area without the anchor base station being aware. Accordingly, in addition to seeking to page the terminal device by transmitting a paging message for the terminal device corresponding to that discussed above in relation to step T2 of FIG. 5 (represented in step U3 FIG. 6), the anchor base station also notifies other base stations in its tracking area that they should also seek to page the terminal device, which in this example includes the target base station 101B in whose coverage area the terminal device is now located. Typically a RAN paging tracking area may comprise more than two base stations, but only two are represented in FIG. 6 in the interests of simplicity.

Thus in step U2 the base station sends signalling to the target base station (and other base stations in the RAN tracking area (not shown in FIG. 6)) to indicate data has become available in the network for the terminal device 104.

In this example implementation it is assumed the anchor base station also transmits the data itself to the target base station. However, at this stage of the processing the anchor base station does not know the target base station is the one covering the terminal device's new location, and so, as noted above, will send corresponding signalling to all base stations in its tracking area. Accordingly, in some other implementations, for example if it is expected the amount of data may be relatively large, the anchor base station might not transmit the data to the target base station at this stage of the processing to save on the amount of signalling needed between base stations, but may instead only transmit an indication that there is data available for the terminal device. The data itself may then be forwarded to the relevant base station later when it is determined which base station is covering the terminal device's current location (i.e. which base station is the target base station).

In step U3 the anchor base station transmits a paging message to the terminal device as discussed above with reference to step T2 in FIG. 5.

In step U4, the target base station (and all other base stations in the tracking area which received the notification in step U2), having established there is data available for transmission from the radio network infrastructure to the terminal device that might be within their coverage area, also sends a paging message for the terminal device. These paging messages correspond with the paging message transmitted by the anchor base station, as discussed above with reference to step T2 in FIG. 5. In some cases the anchor base station may indicate to the other base stations in its tracking area, including the target base station, the specific preamble and/or network allocated resource to indicate in their paging message in the notification of step U2 so that all base stations which transmit a paging message identify the same preamble and/or network allocated resource (in this case C-RNTI). However, in other implementations, the individual base stations may be free to make their own selection of the preamble and/or network allocated resource (e.g. C-RNTI) to include in their paging message. This can help retain flexibility in how these parameters are used and allocated within each communication cell. This in accordance with some approaches the allocated network resource (e.g. C-RNTI) may be coordinated across all cells in a tracking area (RAN notification area). In some other approaches the allocated network resource (e.g. C-RNTI) may be allocated by individual base stations on a per-cell basis such that each base station involved in paging the terminal device allocates a resource for the terminal device that is reserved for use to support subsequent communications with the terminal device, or reserved until it is determined the UE is not located in the relevant cell, e.g. the reservation can be lifted if no response to the paging message is received within a predetermined period of time or based on signalling received form another base station, e.g. signalling indicating another base station will serve the data communication with the terminal device.

As noted above, the paging may be based on broadly conventional techniques, but modified to incorporate additional information such as discussed above, which in this example includes a C-RNTI which is allocated (i.e. reserved) for the terminal device to support subsequent data exchange without requiring the terminal device to enter an active RRC connected mode. Thus, a paging message may be sent by addressing an allocation of physical transmission resources to a common paging identifier, e.g. P-RNTI in an LTE context, with data transmitted on the allocated physical transmission including an identifier for the terminal device(s) being paged, and in accordance with the principles described herein, also an indication of a network allocated resource that may be used for subsequently communicating with the terminal device. The identifier for a terminal device being paged may, for example, comprise a TMSI (Temporary Mobile Subscriber Identity) or an IMSI (International Mobile Subscriber Identity) for the terminal device or a Resume ID allocated to the terminal device before suspension of the RRC connection/entering the inactive mode.

In step U5 the terminal device transmits a paging response to whichever is its currently selected base station, i.e. in this example the target base station, based on having received the paging message received from this base station. This step is similar to, and will be understood from the above description of step T3 in FIG. 5, albeit the communication is between the terminal device and the target base station based on the paging message received from the target base station, rather than between the terminal device and the base station with which it was most recently in an active RRC connected mode.

On receiving the paging response in step U5, the target base station determines the terminal device 104 is within its coverage area (i.e. it is target base station). In this example implementation, the target base station has already received the data to be communicated with the terminal device in step U2, and so there is in principle no need to inform the anchor base station that it will communicate the data to the terminal device. However, if the data is not transmitted to all base stations in a RAN tracking area in step U2, the target base station may, on determining it is the base station covering the terminal device's current location, inform the anchor base station of this, and the anchor base station may then communicate the data to the target base station. All other base stations in the tracking area/RAN notification area (including the anchor base station) do not receive a paging response in response to the paging messages they have sent for the terminal device, and so these base stations may determine the terminal device is not within their communication cell. These other base stations may thus release the reservation of the network allocated resource indicated in their paging message and discard any data they have received for the terminal device (of course if the anchor base station itself has not yet communicated the data to the target base station, it should not discard the data until it has done so). Although in principle each base station may determine it is not responsible for serving the terminal device based on it not receiving a response to its paging message, in practice it may be more appropriate for the base stations to communicate with one another to indicate when a base station has received a response to its paging message. Thus a base station that receives a response to its paging message may inform other base stations of this, so the other base stations know they are not responsible for serving the terminal device. This can help, for example, ensure an appropriate mechanism for re-paging can be provided, for example if a base station does not receive a response from the terminal device and does not receive any indication from another base station indicating the other base station has received a response from the terminal device within a predefined period, the base station may attempt to re-page the terminal device.

In a manner corresponding to that described above for step T4 in FIG. 5, and after step U5, in step U6 the target base station 101B proceeds to communicate the data received from the core network 102 by the anchor base station 101A (in steps U1 and U2) to the terminal device 104. In this example implementation this is done by the target base station allocating downlink resources to the terminal device by addressing control signalling on a physical downlink control channel, e.g. PDCCH in LTE terminology, to the C-RNTI allocated to the terminal device in the paging message of step U4 to indicate physical transmission resources on a physical downlink shared channel, e.g. PDSCH in LTE terminology, on which the data is to be transmitted. In this regard, the process of transmitting the data in step U6 may be based on conventional data transmission schemes in wireless telecommunications networks, albeit with the terminal device not being in an active RRC connected state and having received its temporarily radio network identifier in association with a paging message received from the base station (i.e. step U4 in FIG. 5) as opposed to during an RRC connection setup procedure.

It will be appreciated there are various modifications and additions that may be made to the processing described above, for example with reference to FIGS. 5 and 6.

For example, in some implementations the core network may be informed the terminal device is now within the communication cell covered by the target base station, so that the target base station should now be considered the anchor base station.

In networks in which a common uplink channel similar to PRACH is defined for the purpose of uplink based mobility, this channel may be utilised for the paging response from the terminal device. In this case the paging response may be received by multiple base stations. This may be one scenario in which it is appropriate for the individual base stations to indicate in their paging message a characteristic for a terminal device to use for the paging response, e.g. a specific preamble, so that a base station can determine if a paging response is transmitted by the terminal device in response to their paging message, or another base station's paging message. That is to say, the allocation of the paging preamble individually by each base station allows the set of base stations in a tracking area to determine which of them the terminal device is currently camped on. For example, if a first base station assigns the terminal device with PREAMBLE_A in its paging message and a second base station assigns the terminal device with PREAMBLE_B in its paging message, then if the terminal device transmits PREAMBLE_A in its paging response, the base stations comprising the radio network can determine which cell the terminal device is currently camped on (in this example, the first base station).

In another embodiment utilising a common PRACH for multiple base stations, the paging preamble that is signalled in steps U3 and U4 of FIG. 6 may be comprise a "base preamble", and the preamble that the terminal device uses in its paging response may be a function of the base preamble and the identity of the base station to which it is camped on. Some examples of this approach include the following:

The base stations that belong to a RAN notification area (tracking area) are listed in an RRC message (e.g. received by the terminal device before it entered the RRC connected inactive state). The position of the base stations in this notification area list provides an index of the individual base stations. When the terminal device receives a paging message, it knows the base station from which it received that paging message (because it is camped to that base station) and may thus determine the index of the base station from which it received the paging message. In step U5, the terminal device then may then use a preamble in its paging response corresponding to a combination of the base preamble received in the paging message and the index for the base station on which it is camped. Thus, as a specific example, if the base preamble is preamble number 500, and the UE determines that it received a paging message from the base station with index=5 in the RAN notification area, the terminal device may use preamble number 505 its paging response in step U5.

As a variation of the previous approach, the terminal device may determine an index of the base station in the RAN notification area on which it received the paging message and the preamble that is used in its paging response in step U5 may be a scrambled version of the base preamble, where the scrambling sequence is a function of the index.

In another variation of the above-described approach, the paging messages of steps U3 and U4 may be transmitted in an SFN (single frequency network) area. E.g. all the base stations in the RAN notification area may participate in the SFN. In Step U5, the terminal device may send a preamble and this is received by a number of the base stations in the SFN area (e.g. those that are closest to the terminal device may typically receive the preamble). The base stations can then compare, over a backhaul interface, the measurements on the received preamble to determine which base station (or subset of base stations) received the preamble with the greatest signal quality. Thus, when the data is sent to the terminal device (e.g. in a step corresponding to step U6), it may be conveyed using a subset of one or more of the base stations associated with the best radio channel conditions for the terminal device, thereby helping to save overall transmission power in the network and reduce interference.

In one example embodiment, the SFN area may be defined as a subset of the RAN notification area. Depending on preference and network deployment, different RAN notification areas can be configured, where the smallest area may consist of only one cell, and some areas may consist of a few cells, and yet some areas may comprise a larger number of cells, even as large as a whole tracking area. This nature of this deployment may be expected to differ between operators, but could also differ within one PLMN or Tracking Area. One aim of a SFN based network is that the terminal device should receive the same signal from more than one base-station, but seemingly coming from one base-station via multipath fading. This implies that the terminal device will likely only receive a transmission from a relatively small number of base-stations at the same time (transmitting synchronously). Based on this, it may be appropriate for the RAN notification area to be relatively small, for example smaller than the core network level tracking area and/or it may be appropriate for a paging strategy to subdivide the RAN notification area in smaller SFN based paging areas.

Dividing the RAN notification area into smaller SFN areas may be done on a static or dynamic basis. Thus, a terminal device may move within a relatively large area (the RAN notification area) which is larger than individual SFN areas, without being required to informing the network when changing area too often. Networks may configure the sizes of the areas and/or whether a terminal device should inform the network when moving out of SFN areas or only when moving outside a RAN notification area.

Then when the network needs to reach the terminal device it can decide whether to page the terminal device in all the different SFN areas more or less at the same time, or to page the UE in the different SFN areas one by one based on predefined strategy e.g. starting in the SFN area in which the UE was last known to be present.

These types of approach could also mean that a preamble that is allocated for a paging response could be associated with an SFN area and not an individual base station.

In certain embodiments of the disclosure, the paging messages in steps U3 and/or U4 in FIG. 6 (and the corresponding message at step T2 in FIG. 5) may include an indication of the transmit power of the paging message. The terminal device may then use this transmit power in an open loop power control process in order to derive a transmit power for the preamble. This may be helpful in certain implementations since open loop power control operation is typically based on parameters derived on the PBCH or SYNC channels, but in some scenarios beamforming for these channels may be different to the beamforming of the channels used for paging. This approach thus allows the terminal device to determine a transmit power that is more tailored to the paging process.

In some example implementations, the paging response of step U5 in FIG. 6 (and the corresponding message in step T3 in FIG. 5) may include an identifier for the terminal device to use in association with a message that is sent along with the preamble, for example using grant-free access or using contention based uplink resources for use with a two-step RACH procedure. This can allows the terminal device to transmit small amounts of uplink data, e.g. a RRC Connection Request if the terminal device determines that it needs to transition to an active RRC connected mode.

In some other example implementations, the base station may provide an uplink grant in the paging message to allow the terminal device to transmit data in the uplink, such as an RRC Connection Request or parameters related to resuming a connection. In this regard, the uplink grant may be considered a network allocated resource and may be provided in addition to, or instead of, a radio network identifier, such as a C-RNTI, as discussed in the examples above.

The timing of an uplink data transmission will be established relative to the downlink transmissions, and hence may not be synchronised to the UL (e.g. if the terminal device is located a significant distance from the base station). The transmission power for the uplink message may be determined by the terminal device by any of several different techniques (e.g. open loop uplink power control, where the UE estimates the path loss of the downlink transmission and sets the transmit power of the uplink transmission to meet an SIR, signal-to-interference, target). Hence it might in some situations be advantageous for the uplink transmission to contain a preamble for timing advance and channel estimation purposes. This preamble may, for example, be uniquely assigned to the terminal device in the uplink grant. The uplink grant may also indicate the size of the MCS (modulation and coding scheme), frequency and time resources, transport block size (TBS), for the message.

In accordance with some other example implementations, the base station may provide a downlink grant in the paging message to allow the terminal device to receive the data on the granted resources. In this regard, the downlink grant may be considered a network allocated resource and may be provided in addition to, or instead of, a radio network identifier, such as a C-RNTI, as discussed in the examples above.

In yet further example implementations, the terminal device location may be tracked by the network if the terminal device transmits uplink reference signalling for the network to measure. In this case, the paging message providing the terminal device with an indication of a network allocated resource would not need to be sent by multiple base stations in a RAN notification area, but rather because the network already knows in which cell the terminal is, then it can transmit a single paging message in that cell, and furthermore knows to forward data to that cell. The "anchor base station" may also be continuously updated as the terminal device moves around the network and this may be signalled back to the core network as appropriate, or alternatively the anchor base station may be updated only when the paging message needs to be sent (based on the last cell which the network determined to receive the best uplink signal). In this case, the paging message and paging response would not be needed to determine the terminal device location, but may still be used for the purposes of allocating the network allocated resource to be used for subsequently communicating data with the terminal device. In this scenario it may be considered helpful in some situations for the terminal device to monitor for a paging message following each uplink tracking transmission.

The data exchange signalling in step U6 of FIG. 6 (and in step T4 of FIG. 5) may in some implementations also contain timing advance and power control information for the terminal device (corresponding to the information currently conveyed in a random access response message in an LTE context). The timing advance and power control information may be based on measurements by the base station on the paging response transmitted by the terminal device. By communicating timing advance and power control information to the terminal device, the base station can help ensure that future uplink transmissions from the terminal device are more likely to be appropriately timing advanced/power controlled. An example future uplink transmission from the terminal device might be acknowledgement signalling (e.g. ACK/NACK) transmitted on a physical uplink control channel, PUCCH, relating to the data communicated in step U6 in FIG. 6 (and the corresponding step T4 in FIG. 5).

In some embodiments, the C-RNTI (or other form of identifier/network allocated resource) may discarded by the terminal device following the successful exchange of the data. This may be performed, for example, after a predefined timer expiry, after successful transmission of an acknowledgement on the uplink, or following transmission (and acknowledgement) of an uplink response message. In other examples, the C-RNTI (or other network allocated resource) may be stored by the device for future communication, until this is overwritten or deleted by the network. In this case, a paging message subsequently received (while the terminal device monitors for signalling address to P-RNTI) will inform the terminal device to start monitoring for control signalling address to the previously stored C-RNTI (to receive a future downlink communications message).

It will be appreciated that while the above-described example implementations have focused on an example in which the RAN-level paging notification area is taken to correspond with the CN-level tracking area, this is simply for ease of explanation, and in practice the RAN notification area may be a different size, and in particular may comprise fewer base stations than the core network tracking area.

Furthermore, it will be appreciated that whilst in the above-described examples the data is first received at an anchor base station for the terminal device from where it may be communicated to other base stations in a RAN paging notification area as appropriate, in other implementations the data may be initially received, for example from the core network, at all base stations in a RAN paging notification area. Each base station in the RAN paging notification area may then send a paging message as discussed above, with the base station which receives a response forwarding on the data. That is to say, in some example implementations there might not be what is referred to above as an anchor base station for the terminal device.

Thus there has been described a method of communicating data between a radio network infrastructure and a terminal device in a wireless telecommunications network. The method comprises establishing at a radio network infrastructure element there is data available for communication between the radio network infrastructure and the terminal device and transmitting a paging message for the terminal device from the radio network infrastructure element. The paging message comprises an indication of an identifier for the terminal device and an indication of a network allocated resource for use in subsequently communicating the data between the radio network infrastructure element and the terminal device. In response to receiving the paging message the terminal device transmits to the radio network infrastructure element a paging response message indicating the terminal device received the paging message, after which the data is communicated between the radio network infrastructure element and the terminal device using the network allocated resource.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard. In particular, while some of the specific examples discussed above have been with reference to a base station as the network infrastructure equipment sponsor for paging, in other implementations other network infrastructure equipment, for example a TRP in a NR network, may be responsible for this paging.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs: Paragraph 1. A method of communicating data between a radio network infrastructure and a terminal device in a wireless telecommunications network, the method comprising: establishing at a radio network infrastructure element there is data available for communication between the radio network infrastructure and the terminal device; transmitting a paging message for the terminal device from the radio network infrastructure element, wherein the paging message comprises an indication of an identifier for the terminal device and an indication of a network allocated resource for use in subsequently communicating the data between the radio network infrastructure element and the terminal device; and communicating the data between the radio network infrastructure element and the terminal device using the network allocated resource.

Paragraph 2. The method of paragraph 1, further comprising receiving at the radio network infrastructure element a paging response from the terminal device indicating the terminal device received the paging message transmitted by the radio network infrastructure element.

Paragraph 3. The method of paragraph 1 or 2, wherein the network allocated resource comprises a network allocated identifier for the terminal device.

Paragraph 4 The method of paragraph 3, wherein the network allocated identifier for the terminal device comprises a cell-specific radio network temporary identifier, C-RNTI.

Paragraph 5. The method of paragraph 3 or 4, wherein communicating the data between the radio network infrastructure element and the terminal device using the network allocated resource comprises transmitting the data in association with the network allocated identifier.

Paragraph 6. The method of paragraph 5, wherein transmitting the data in association with the network allocated identifier comprises addressing an allocation message comprising an indication of an allocation of radio resources to be used for communicating the data from the radio network infrastructure element to the terminal device to the network allocated identifier.

Paragraph 7. The method of paragraph 5, wherein transmitting the data in association with the network allocated identifier comprises addressing an allocation message comprising an indication of an allocation of radio resources to be used for communicating the data from the terminal device to the radio network infrastructure element to the network allocated identifier.

Paragraph 8. The method of paragraph 2, wherein communicating the data between the radio network infrastructure element and the terminal device comprises communicating the data from the terminal device to the radio network infrastructure element as a part of the paging response.

Paragraph 9. The method of any of paragraphs 1 to 8, wherein the network allocated resource comprises an allocation of physical transmission resources to be used for communicating the data between the radio network infrastructure element and the terminal device.

Paragraph 10. The method of paragraph 9, wherein allocation of physical transmission resources comprise resources on a physical uplink shared channel.

Paragraph 11. The method of paragraph 9, wherein allocation of physical transmission resources comprise resources on a physical downlink shared channel.

Paragraph 12. The method of any of paragraphs 1 to 11, wherein establishing at the radio network infrastructure element there is data available for communication between the radio network infrastructure and the terminal device comprises the radio network infrastructure element receiving an indication there is data available for communication between the radio network infrastructure and the terminal device from a core network element of the wireless telecommunications network.

Paragraph 13. The method of any of paragraphs 1 to 12, wherein establishing there is data available for communication between the radio network infrastructure and the terminal device comprises the radio network infrastructure element receiving an indication there is data available for communication between the radio network infrastructure and the terminal device from a further radio network infrastructure element of the wireless telecommunications network.

Paragraph 14. The method of paragraph 13, further comprising the radio network infrastructure element conveying to the further radio network infrastructure element an indication that it has received the paging response from the terminal device and receiving the data available for communication between the radio network infrastructure and the terminal device from the further radio network infrastructure element in response thereto.

Paragraph 15. The method of any of paragraphs 1 to 14, further comprising the radio network infrastructure element conveying an indication there is data available for communication between the radio network infrastructure and the terminal device to a further radio network infrastructure element of the wireless telecommunications network.

Paragraph 16. The method of any of paragraphs 1 to 15, wherein the network allocated resource for use in subsequently communicating the data between the radio network infrastructure element and the terminal device is selected from among a plurality of possible network allocated resources by the radio network infrastructure element.

Paragraph 17. The method of any of paragraphs 1 to 16, wherein an indication of the network allocated resource is received by the radio network infrastructure element from a further radio network infrastructure element of the wireless telecommunications network.

Paragraph 18. The method of any of paragraphs 1 to 17, wherein the paging message transmitted by the radio network infrastructure element comprises an indication of a characteristic to be used by the terminal device for transmitting the paging response to allow the radio network infrastructure element to determine the paging response is from the terminal device.

Paragraph 19. The method of paragraph 18, wherein the indication of a characteristic comprises an indication of a preamble sequence for the terminal device to use for the paging response.

Paragraph 20. The method of any of paragraphs 1 to 19, wherein communicating the data between the radio network infrastructure element and the terminal device using the network allocated resource is performed without the terminal device entering a radio resource control, RRC, connected mode of operation in response to receiving the paging message.

Paragraph 21. The method of any of paragraphs 1 to 20, wherein the step of communicating the data between the radio network infrastructure element and the terminal device using the network allocated resource further comprises communicating an indication of a timing advance and/or power control command for a communication from the terminal device to the radio network infrastructure element.

Paragraph 22. The method of any of paragraphs 1 to 21, wherein the radio network infrastructure element operates in conjunction with a further radio network infrastructure element in single frequency network, and wherein the method further comprises: establishing at the further radio network infrastructure element there is data available for communication between the radio network infrastructure and the terminal device; transmitting the paging message for the terminal device from the further radio network infrastructure element, and communicating the data between the further radio network infrastructure element and the terminal device using the network allocated resource.

Paragraph 23. The method of any of paragraphs 1 to 22, further comprising: establishing at a further radio network infrastructure element there is the data available for communication between the radio network infrastructure and the terminal device; transmitting a paging message for the terminal device from the further radio network infrastructure element, wherein the paging message comprises an indication of an identifier for the terminal device and an indication of a further network allocated resource for use in subsequently communicating the data between the further radio network infrastructure element and the terminal device; determining the terminal device is not within a coverage area of the further radio network infrastructure element; and in response to determining the terminal device is not within a coverage area of the further radio network infrastructure element, not communicating the data between the further radio network infrastructure element and the terminal device.

Paragraph 24. A method of operating a radio network infrastructure element for communicating data between a radio network infrastructure and a terminal device in a wireless telecommunications network, the method comprising: establishing there is data available for communication between the radio network infrastructure and the terminal device; transmitting a paging message for the terminal device, wherein the paging message comprises an indication of an identifier for the terminal device and an indication of a network allocated resource for use in subsequently communicating the data between the radio network infrastructure element and the terminal device; and communicating the data between the radio network infrastructure element and the terminal device using the network allocated resource.

Paragraph 25. A radio network infrastructure element for use in communicating data between a radio network infrastructure and a terminal device in a wireless telecommunications network, wherein the radio network infrastructure element comprises controller circuitry and transceiver circuitry configured to operate together such that the radio network infrastructure element is operable to: establish there is data available for communication between the radio network infrastructure and the terminal device; transmit a paging message for the terminal device, wherein the paging message comprises an indication of an identifier for the terminal device and an indication of a network allocated resource for use in subsequently communicating the data between the radio network infrastructure element and the terminal device; and communicate the data between the radio network infrastructure element and the terminal device using the network allocated resource.

Paragraph 26. Circuitry for a radio network infrastructure element for use in communicating data between a radio network infrastructure and a terminal device in a wireless telecommunications network, wherein the circuitry comprises controller circuitry and transceiver circuitry configured to operate together such that the circuitry is operable to: establish there is data available for communication between the radio network infrastructure and the terminal device; transmit a paging message for the terminal device, wherein the paging message comprises an indication of an identifier for the terminal device and an indication of a network allocated resource for use in subsequently communicating the data between the radio network infrastructure element and the terminal device; and communicate the data between the radio network infrastructure element and the terminal device using the network allocated resource.

Paragraph 27. A method of operating a terminal device for communicating data between a radio network infrastructure and the terminal device in a wireless telecommunications network, the method comprising: receiving a paging message from a radio network infrastructure element, wherein the paging message comprises an indication of an identifier for the terminal device and an indication of a network allocated resource for use in subsequently communicating the data between the radio network infrastructure element and the terminal device; and communicating the data between the radio network infrastructure element and the terminal device using the network allocated resource.

Paragraph 28. A terminal device for use in communicating data between a radio network infrastructure and the terminal device in a wireless telecommunications network, wherein the terminal device comprises controller circuitry and transceiver circuitry configured to operate together such that the terminal device is operable to: receive a paging message from a radio network infrastructure element, wherein the paging message comprises an indication of an identifier for the terminal device and an indication of a network allocated resource for use in subsequently communicating the data between the radio network infrastructure element and the terminal device; and communicate the data between the radio network infrastructure element and the terminal device using the network allocated resource.

Paragraph 29. Circuitry for a terminal device for use in communicating data between a radio network infrastructure and the terminal device in a wireless telecommunications network, wherein the circuitry comprises controller circuitry and transceiver circuitry configured to operate together such that the circuitry is operable to: receive a paging message from a radio network infrastructure element, wherein the paging message comprises an indication of an identifier for the terminal device and an indication of a network allocated resource for use in subsequently communicating the data between the radio network infrastructure element and the terminal device; and communicate the data between the radio network infrastructure element and the terminal device using the network allocated resource.

REFERENCES

[1] 3GPP document RP-160671, "New SID Proposal: Study on New Radio Access Technology," NTT DOCOMO, RAN #71, Gothenburg, Sweden, 7 to 10. Mar., 2016
[2] Holma H. and Toskala A, "LTE for UMTS OFDMA and SC-FDMA based radio access", John Wiley and Sons, 2009
[3] ETSI TS 136 321 V13.0.0 (2016 February)/3GPP TS 36.321 version 13.0.0 Release 13
[4] "New WI proposal: Signalling reduction to enable light connection for LTE", 3GPP TSG RAN Meeting #71, RP-160540, Gothenburg, Sweden, 7-10 Mar. 2016
[5] "Text Proposal to TR 38.804 on UE states and state transitions for NR", 3GPP TSG-RAN WG2 #96, R2-168856, R2-168856, 14-18 Nov. 2016
[6] "Evaluation on RAN initiated paging and MME initiated paging", 3GPP TSG-RAN WG2 Meeting #94, R2-163930, Nanjing, China, 23-27 May 2016
[7] "RAN based Update mechanism for new RAN state", 3GPP TSG RAN WG2 Meeting #96, R2-168525, Reno, USA, 14-18 Nov. 2016
[8] "Discussion on RAN notification area for the new RRC state" 3GPP TSG RAN WG2 Meeting #96, R2-168524, Reno, USA, 14-18 Nov. 2016
[9] "Inactive State principles—RAN based notification area", 3GPP TSG RAN WG2 Meeting #96, R2-168602, Reno, USA, 14-18 Nov. 2016

What is claimed is:

1. Circuitry for a radio network infrastructure element for use in communicating data between a radio network infrastructure and a terminal device in a wireless telecommunications network, wherein the circuitry is configured to:
   transmit a paging message for the terminal device, wherein the paging message comprises an indication of an identifier for the terminal device and an indication of a network allocated resource; and
   trigger another radio network infrastructure to page the terminal device in a case that data is received from a terminal device previously configured to enter a Radio Resource Control (RRC) inactive state.

2. The circuitry for the radio network infrastructure element according to claim 1, wherein the circuitry is further configured to
   receive at the radio network infrastructure element a paging response from the terminal device indicating the terminal device received the paging message transmitted by the radio network infrastructure element.

3. The circuitry for the radio network infrastructure element according to claim 1, wherein the network allocated resource includes a network allocated identifier for the terminal device.

4. The circuitry for the radio network infrastructure element according to claim 1, wherein the network allocated identifier for the terminal device includes a cell-specific radio network temporary identifier, C-RNTI.

5. The circuitry for the radio network infrastructure element according to claim 1, wherein the circuitry is further configured to
   communicate the data between the radio network infrastructure element and the terminal device using the network allocated resource, and
   transmit the data in association with the network allocated identifier.

6. The circuitry for the radio network infrastructure element according to claim 5, wherein the circuitry for transmitting the data in association with the network allocated identifier is further configured to
   address an allocation message comprising an indication of an allocation of radio resources to be used for communicating the data from the radio network infrastructure element to the terminal device to the network allocated identifier.

7. The circuitry for the radio network infrastructure element according to claim 5, wherein the circuitry for transmitting the data in association with the network allocated identifier is further configured to
   address an allocation message comprising an indication of an allocation of radio resources to be used for communicating the data from the terminal device to the radio network infrastructure element to the network allocated identifier.

8. The circuitry for the radio network infrastructure element according to claim 5, wherein the circuitry for communicating the data between the radio network infrastructure element and the terminal device is further configured to communicate the data from the terminal device to the radio network infrastructure element as a part of the paging response.

9. The circuitry for the radio network infrastructure element according to claim 1, wherein the network allocated resource comprises an allocation of physical transmission resources to be used for communicating the data between the radio network infrastructure element and the terminal device.

10. The circuitry for the radio network infrastructure element according to claim 9, wherein the allocation of physical transmission resources comprises resources on a physical uplink shared channel.

11. The circuitry for the radio network infrastructure element according to claim 9, wherein the allocation of physical transmission resources comprises resources on a physical downlink shared channel.

12. The circuitry for the radio network infrastructure element according to claim 1, wherein the circuitry is further configured to
establish at the radio network infrastructure element there is data available for communication between the radio network infrastructure and the terminal device, and
receive, at the radio network infrastructure element, an indication there is data available for communication between the radio network infrastructure and the terminal device from a core network element of the wireless telecommunications network.

13. The circuitry for the radio network infrastructure element according to claim 12, wherein the circuitry for establishing there is data available for communication between the radio network infrastructure and the terminal device is further configured to
receive, at the radio network infrastructure element, an indication there is data available for communication between the radio network infrastructure and the terminal device from a further radio network infrastructure element of the wireless telecommunications network.

14. The circuitry for the radio network infrastructure element according to claim 1, wherein the circuitry is further configured to
convey an indication there is data available for communication between the radio network infrastructure and the terminal device to a further radio network infrastructure element of the wireless telecommunications network.

15. The circuitry for the radio network infrastructure element according to claim 1, wherein the circuitry is further configured to
select, from among a plurality of network allocated resources by the radio network infrastructure element, the network allocated resource for use in subsequently communicating the data between the radio network infrastructure element and the terminal device.

16. The circuitry for the radio network infrastructure element according to claim 1, wherein the circuitry is further configured to
receive, by the radio network infrastructure element from a further radio network infrastructure element of the wireless telecommunications network, an indication of the network allocated resource.

17. The circuitry for the radio network infrastructure element according to claim 16, wherein the indication of a characteristic comprises an indication of a preamble sequence for the terminal device to use for the paging response.

18. The circuitry for the radio network infrastructure element according to claim 1, wherein the paging message transmitted by the radio network infrastructure element comprises an indication of a characteristic to be used by the terminal device for transmitting the paging response to allow the radio network infrastructure element to determine the paging response is from the terminal device.

19. A terminal device for use in communicating data between a radio network infrastructure and the terminal device in a wireless telecommunications network, wherein the terminal device comprises circuitry configured to:
receive a paging message from a radio network infrastructure element, wherein the paging message comprises an indication of an identifier for the terminal device and an indication of a network allocated resource; and
receive a paging message from another radio network infrastructure element in a case that the terminal device was previously configured by the radio network infrastructure to enter a Radio Resource Control (RRC) inactive state.

20. Circuitry for a terminal device for use in communicating data between a radio network infrastructure and the terminal device in a wireless telecommunications network, wherein the circuitry is configured to:
receive a paging message from a radio network infrastructure element, wherein the paging message comprises an indication of an identifier for the terminal device and an indication of a network allocated resource; and
receive a paging message from another radio network infrastructure element in a case that the terminal device was previously configured by the radio network infrastructure to enter a Radio Resource Control (RRC) inactive state.

\* \* \* \* \*